May 13, 1969 E. HAACK ET AL 3,443,903

CHEMICAL ANALYSIS TEST STRIPS

Filed Oct. 7, 1965

ERICH HAACK / HANS-GEORG REY / PETER RIECKMANN INVENTORS

BY

Burgess, Dinklage & Sprung

United States Patent Office 3,443,903
Patented May 13, 1969

---

3,443,903
CHEMICAL ANALYSIS TEST STRIPS
Erich Haack, Heidelberg, Hans-Georg Rey, Mannheim, and Peter Rieckmann, Mannheim-Waldhof, Germany, assignors to C. F. Boehringer & Soehne GmbH, Mannheim-Waldhof, Germany, a corporation of Germany
Filed Oct. 7, 1965, Ser. No. 493,686
Claims priority, application Germany, Nov. 12, 1964, B 59,646
Int. Cl. G01n 31/22
U.S. Cl. 23—230    13 Claims

ABSTRACT OF THE DISCLOSURE

Chemical analysis test strips comprising a strip of porous material impregnated with a reagent for determining the presence of a biochemical or like substance in a fluid attached over a relatively minor portion thereof in end to end relationship with a strip of material which is inert to the medium in which the test is being carried out and which is substantially inert to the testing reagent.

---

This invention relates to chemical testing. It more particularly relates to a novel system of using test strips for chemical analysis.

It has been known for many years to test certain chemical properties of fluids with paper impregnated with reagents as, for example, litmus paper for pH. Recently this practice has been expanded to the testing of other chemical properties and even to the testing of fluid components by the use of suitably impregnated strips of paper and other porous materials, for example, curcurma paper for the detection of boric acid, potassium iodide-starch paper for the detection of oxidation agents, lead acetate paper for the detection of sulfide, and various test papers for the detection of glucose, protein and the like in biological fluids, especially in urine. This method of testing has achieved great importance since it permits such testing to be carried out by unskilled people.

Althorugh strip chemical testing is, in many ways, entirely satisfactory, it does have some drawbacks; for example, the tester generally holds the test strip with his fingers to thereby prevent the test strip from coming wholly into contact with only the medium being tested. Further, it is possible that the contact between the fingers and the test strip may contaminate a portion of the strip, possibly obscuring or impairing the results being sought. Additionally, it also sometimes happens that multiple test strips are inserted into the medium being tested and the reagents contained in each test strip affect the results of the tests of the other strips whereby the total testing results may be less than satisfactory. Still further, the hygienic problem attendant the handling and use of chemical reagent test strips exists.

It is, therefore, an object of this invention to provide a new type of analytical chemical test strip.

It is a further object of this invention to provide a process of safely testing for chemical properties and for the presence of certain materials with analytical test strips.

It is another object of this invention to provide a safe and reliable means of testing for chemical properties in the presence of various chemical materials with a multiplicity of test strips simultaneously.

Other and additional objects of this invention will become apparent from a consideration of this entire specification.

Fulfilling these objects, this invention comprises a test strip of impregnated paper, cloth or the like affixed to at least one plastic strip at at least one portion thereof.

This invention will be best understood with reference to the accompanying drawing wherein FIG. 1 is a side elevation of one embodiment of the test strip of this invention;

Figure 1:
Figure 2:
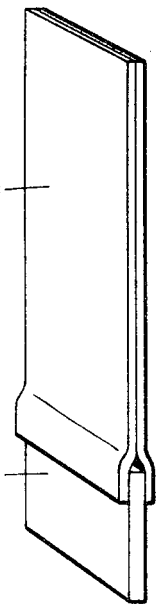
FIG. 2 is an isometric view of the test strip of FIG. 1.
Figure 3:
FIG. 3 is a side elevation of another embodiment of the test strip of this invention and shows a test strip made from one strip of synthetic resin foil and two pieces of test paper.
Figure 4:
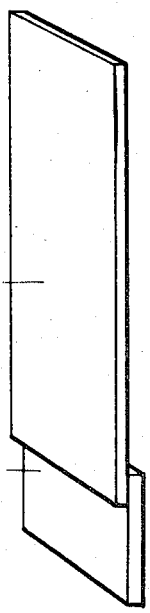
FIG. 4 is an isometric view of the test strip of FIG. 3.
Figure 5:
FIG. 5 is a side elevation of another embodiment of the test strip of this invention where there are present two strips of synthetic resin foil and two pieces of test paper.
Figure 6:
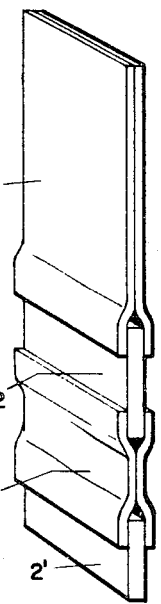
FIG. 6 is an isometric view of the test strip of FIG. 5.
Figure 7:
FIG. 7 is a side elevation of still another embodiment of the test strip of this invention and shows a test strip made from one strip of synthetic resin foil and two pieces of test paper.
Figure 8:
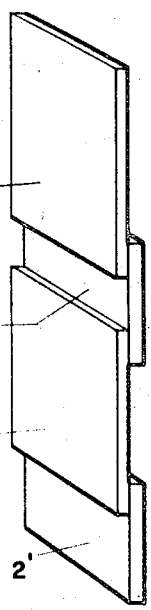
FIG. 8 is an isometric view of the test strip of FIG. 7.

Referring now to the drawing, the test strip 2 is attached to a pair plastic strips 1, as shown in FIGS. 1 and 2. In the alternative, the test strip 2 can be attached to a single plastic strip 5, as shown in FIGS. 3 and 4.

Where multiple testing is to be accomplished simultaneously, a pair of plastic strips 1 can be attached to a test strip 2 and another test strip 2' can be attached to the first test strip 2 through intermediate plastic strips 3, as shown in FIGS. 5 and 6. Similarly, the same results can be accomplished with a single plastic strip 5 and a single plastic strip bridge 4, as shown in FIGS. 7 and 8.

Thus, 1, 2 or any number of test strips may be joined together for testing purposes while being maintained separate and distinct from each other, both physically and chemically.

It is desired, but not essential, that the plastic strip or strips and the test strip or strips be joined at their short or narrow edges so as to form a maximum separation of the holder and the test strip or between test strips.

The affixing of the indicator paper strips onto the synthetic resin foils can be carried out very easily, for example, by placing two thin synthetic resin foils one on top of the other and then welding them together after having inserted a narrow edge of a test paper between a narrow edge zone of the two foils (see FIGS. 1 and 2).

In the same way, however, a narrow edge of an indicator paper strip can also be sealed onto a narrow edge zone of a single synthetic resin foil (see FIGS. 3 and 4).

By the combination of two or more indicator paper strips with one or two synthetic resin foils, there can also be obtained, in a similar manner, multi-test strips (see FIGS. 5, 6, 7, and 8).

Instead of sealing or welding, the indicator paper strips can also be affixed to the synthetic resin foils by the use of suitable adhesives.

As synthetic resin foils, there can be used all of synthetic resins which are insoluble in water, as for example polyvinylchloride, polyterephthalic acid esters, polyethylene-coated polyterephthalic acid esters, polypropylene and superpolyamides. The decisive factor for the choice of a suitable synthetic resin is, in the first place, a good weldability and, of course, also the cost and availability thereof. Therefore, it is preferable to use polyvinylchloride foils or polyethylene-coated polyterephthalic acid ester foils.

When the indicator paper strips are applied to the synthetic resin foils by welding or sealing, this can be carried out in known manner, as for example by the heat impulse or heat contact process or by means of high frequency radiation.

In order particularly to accentuate the color reaction of the indicator papers, the synthetic resin foils employed can, preferably, be employed in the form having contrasting colors. It is also possible to use a synthetic resin-coated paper instead of a synthetic resin foil, the test strips thereby being provided with an opaque background.

The test strips according to the present disclosed invention have the particular advantage that the test papers are, on the one hand, available for the reactions with fluids to be tested or analyzed in the well-known and proved manner but without the disadvantages which are so disturbing in the case of the test papers as heretofore available. Since the indicator papers in the test strips according to the present invention are completely moistened with the fluid under investigation, there is no longer observed a chromatography of the colored reaction products in the dry paper zone which is a disturbing side effect in the case of the conventional test papers. Thus, in the case of the test strips according to the present invention, a uniform color reaction is obtained which can be easily and accurately evaluated.

A further important advantage of the new test strips is the fact that the test papers themselves do not have to be touched in the carrying out of the tests. Quite apart from hygienic reasons, this is very desirable in the case of poisonous reagents.

Another advantage of the test strips according to the present invention is that they permit a considerable saving in cost in the case of expensive reagents since the actual absorbent surface area impregnated with the reagent required for use for each test is very small.

A further advantage of the test strips according to the present invention lies in the following: provided that the synthetic resin foil used is hydrophobic, as is the case, for example, with polyethylene, polyvinylchloride and polyterephthalic acid esters, after the moistening of the individual areas of test paper with the fluid to be tested, the reagents do not run into one another in the case where the multi-test strip is being used. When, for example, a test strip according to the present invention comprises a protein test paper, which contains an acidic buffer substance, in combination with a pH test paper, there is no danger of the acidic buffer substance of the protein test paper coming into contact with the pH paper and thus impairing and even falsifying its result.

The invention is illustrated by the following examples of certain preferred embodiments thereof, although it will be understood that the examples are illustrative only and not intended to limit the scope of the invention unless otherwise specifically indicated.

Example 1

Onto the edge of a 5–10 cm. wide synthetic resin strip, there is welded a 1–5 mm. wide zone of a strip of indicator paper with an overall width of about 5–15 mm. which has been produced in the conventional manner. If it is desired to obtain a multi-test paper, then onto the test paper there is longitudinally sealed a synthetic resin strip having a width of about 3–15 mm. which is connected in the same way with one or more other test paper strips. Narrow strips are then cut off at right angles to the longitudinal direction to give single or multi-test strips which are ready to use (see FIGS. 3 and 4 and 7 and 8).

Example 2

Two strips of synthetic resin of 5–10 cm. width are, surface to surface welded together, an indicator test paper strip of about 5–15 mm. width, which has been produced in the usual way, thereby being simultaneously inserted to an extent of 1–5 mm. between and parallel to an edge of the two synthetic resin foils so that the paper strip is sealed between the two strips of synthetic resin. For the production of a multi-test strip, the other side of the test paper strip is sealed in the same manner between two further strips of synthetic resin foil of about 3–15 mm. width and, again in the same way, one or more test paper strips are sealed on the other side of these further strips of synthetic resin foil. Narrow strips are then cut off at right angles to the longitudinal direction to give single or multi-test strips which are ready to use (see FIGS. 1, 2, and 5 and 6).

Test strips as described in Examples 1 and 2 were prepared employing test papers prepared for the dectection of glucose, protein, acetone, chloride, nitrite, phenylketone, urea, pH etc. Examples of these test papers are described, for instance in U.S. Patents Nos. 2,981,606, 3,095,277, 2,676,874, 3,048,475, 3,145,086; British Patents 884,165, 922,606. The test papers were employed singly and in combination. The synthetic foil which was used was a polyvinyl chloride foil. The test strips were employed in the chemical or clinical laboratory of a hospital for analysis of urine of patients admitted to the hospital. The conventional color charts were employed as standards for interpreting the results. These color standards also can be welded onto a further strip of synthetic resin foil instead of another test paper 2′, such combining test paper and color standard to a single article. The results were entirely satisfactory, reproducible, and consistent with more detailed analyses.

We claim:
1. An article adapted for use in testing the properties and components of a fluid medium comprising at least one strip of a porous material impregnated with a reagent for determining the property being tested, attached over a relatively minor portion thereof in end to end relationship with at least one strip of material which is substantially inert to the medium being tested and substantially inert to the said testing reagent.

2. Article as claimed in claim 1 wherein said at least one inert strip is formed of a material selected from the group consisting of polyvinylchloride, polyvinylidene chloride, polyethylene, polypropylene, polyethylene terephthalate and polyhexamethylene-diammonium adipate foils.

3. Article as claimed in claim 1 wherein said at least one impregnated strip is joined in end to end relationship to two of said inert strips each of which inert strips overlap said impregnated strips on a minor portion of the opposite faces thereof.

4. Article as claimed in claim 1 wherein said at least one impregnated strip is joined in end to end relationship with one inert strip with said inert strip overlapping a minor portion of one face of said impregnated strip.

5. Article as claimed in claim 1 wherein said at least one impregnated strip is selected from the group consisting of paper and cloth.

6. Article as claimed in claim 1 wherein said at least one inert strip is formed of a plastic coated paper.

7. Article as claimed in claim 1 wherein said at least one inert strip is formed of a member selected from the group consisting of colored synthetic resin foils, said color being selected so as to not interfere with said color produced in said impregnated strip.

8. Process of testing for a chemical property or for the presence of a chemical material in a fluid medium, which comprises inserting an article as claimed in claim 1 into said medium and comparing the physical characterictics of said impregnated strip with a standard.

9. Article as claimed in claim 1 comprising an alternating structure of said impregnated strips separated by said inert strips wherein each of said impregnated strips is attached over a relatively minor portion thereof in end to end relationship with said inert strips.

10. Article as claimed in claimed 9 wherein each of said impregnated strips is joined in end to end relationship to two inert strips each of which inert strips overlaps said impregnated strip on a minor portion of opposite faces thereof.

11. Article as claimed in claim 9 wherein each of said impregnated strips is joined in end to end relationship to one inert strip with said inert strip overlapping a minor portion of one face of said inert strip.

12. The method of making an article adapted for use in testing the properties and for the presence of a chemical material in a fluid medium, which comprises impregnating a strip of porous material with a reagent suitable for measuring the tested property and joining said impregnated strip in end to end relationship to at least one strip of material which is substantially inert to both said reagent and said medium, with only a minor portion of said impregnated strip being involved in said joining.

13. Process as claimed in claim 12, wherein said joining is accomplished through heat setting.

References Cited

UNITED STATES PATENTS

| | | | |
|---|---|---|---|
| 691,249 | 1/1902 | Dieterich | 23—253 |
| 2,229,155 | 1/1941 | Wenker | 23—253 |
| 2,785,057 | 3/1957 | Schwab et al. | 23—253 |
| 2,889,799 | 6/1959 | Korpman | 23—253 |
| 3,006,735 | 10/1961 | Jordan | 23—253 |
| 3,011,874 | 12/1961 | Deutsch | 23—253 |
| 3,127,281 | 3/1964 | Meyer | 23—253 |
| 3,311,084 | 3/1967 | Edenbaum | 23—253 |

MORRIS O. WOLK, *Primary Examiner.*

ELLIOTT A. KATZ, *Assistant Examiner.*

U.S. Cl. X.R.

23—253